(12) United States Patent
Harrison et al.

(10) Patent No.: US 9,012,357 B2
(45) Date of Patent: *Apr. 21, 2015

(54) LITHIUM EXTRACTION COMPOSITION AND METHOD OF PREPARATION THEREOF

(71) Applicant: Simbol Inc., Pleasanton, CA (US)

(72) Inventors: Stephen Harrison, Benicia, CA (US); C.V. Krishnamohan Sharma, Milpitas, CA (US); Brian E. Viani, Berkeley, CA (US); Diana Rex, San Diego, CA (US)

(73) Assignee: Simbol, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/107,689

(22) Filed: Dec. 16, 2013

(65) Prior Publication Data

US 2014/0102946 A1 Apr. 17, 2014

Related U.S. Application Data

(63) Continuation of application No. 12/972,728, filed on Dec. 20, 2010, now Pat. No. 8,637,428.

(60) Provisional application No. 61/287,983, filed on Dec. 18, 2009.

(51) Int. Cl.
| | |
|---|---|
| B01J 20/00 | (2006.01) |
| B03B 5/00 | (2006.01) |
| B01J 20/04 | (2006.01) |
| B01J 20/14 | (2006.01) |

(52) U.S. Cl.
CPC . *B03B 5/00* (2013.01); *B01J 20/00* (2013.01); *B01J 20/041* (2013.01); *B01J 20/14* (2013.01); *Y10S 502/526* (2013.01)

(58) Field of Classification Search
USPC .......................... 502/414, 411, 415, 439, 526
See application file for complete search history.

(56) References Cited

U.S. PATENT DOCUMENTS

| | | |
|---|---|---|
| 2,964,381 A | 12/1960 | Goodenough |
| 3,306,700 A | 2/1967 | Neipert et al. |
| 3,321,268 A | 5/1967 | Copson et al. |
| 3,523,751 A | 8/1970 | Burkert et al. |
| 4,016,075 A | 4/1977 | Wilkins |
| 4,036,713 A | 7/1977 | Brown |
| 4,116,856 A | 9/1978 | Lee et al. |
| 4,116,858 A | 9/1978 | Lee et al. |
| 4,142,950 A | 3/1979 | Creamer et al. |
| 4,159,311 A | 6/1979 | Lee et al. |
| 4,209,369 A | 6/1980 | Seko et al. |
| 4,221,767 A | 9/1980 | Lee et al. |
| 4,251,338 A | 2/1981 | Retallack |
| 4,276,180 A | 6/1981 | Matson |
| 4,291,001 A | 9/1981 | Repsher et al. |
| 4,347,327 A | 8/1982 | Lee et al. |
| 4,348,295 A | 9/1982 | Burba, III |
| 4,348,296 A | 9/1982 | Bauman et al. |
| 4,348,297 A | 9/1982 | Bauman et al. |
| 4,376,100 A | 3/1983 | Lee et al. |
| 4,381,349 A | 4/1983 | Lee et al. |
| 4,405,463 A | 9/1983 | Jost et al. |
| 4,405,595 A | 9/1983 | Yang et al. |
| 4,430,311 A | 2/1984 | Lee et al. |
| 4,461,714 A | 7/1984 | Burba, III |
| 4,472,362 A | 9/1984 | Burba, III |
| 4,477,367 A | 10/1984 | Burba, III |
| 4,540,509 A | 9/1985 | Burba, III |
| 4,727,167 A | 2/1988 | Burba, III et al. |
| 4,745,977 A | 5/1988 | Love et al. |
| 4,762,656 A | 8/1988 | Ballard et al. |
| 5,015,541 A | 5/1991 | Evans |
| 5,135,652 A | 8/1992 | Boateng |
| 5,145,656 A | 9/1992 | Gallup et al. |
| 5,200,165 A | 4/1993 | Harper et al. |
| 5,219,550 A | 6/1993 | Brown et al. |
| 5,229,003 A | 7/1993 | Duyvesteyn |
| 5,244,491 A | 9/1993 | Brown et al. |
| 5,246,684 A | 9/1993 | Brown et al. |
| 5,254,225 A | 10/1993 | Gallup |
| 5,358,700 A | 10/1994 | Brown et al. |
| 5,389,349 A | 2/1995 | Bauman et al. |
| 5,427,691 A | 6/1995 | Kuyucak et al. |
| 5,441,712 A | 8/1995 | Duyvesteyn et al. |

(Continued)

FOREIGN PATENT DOCUMENTS

| | | |
|---|---|---|
| BE | 861527 | 6/1978 |
| CN | 1558793 | 12/2004 |

(Continued)

OTHER PUBLICATIONS

L.T. Menzheres et al., "Solid-State Interaction of Aluminum Hydroxide with Lithium Salts, Journal of Materials Synthesis and Processing", Plenum Publishing Corporation, 1999, vol. 7, No. 4, pp. 239-244.

A.D. Ryabstev et al., "Sorption of Lithium from Brine into Granular LiCl-2Al(OH)3-mH20 Sorbent under Dynamic Conditions", Russian Journal of Applied Chemistry, 2002, vol. 75, No. 7, pp. 1069-1074.

A.H. Hamzaoui et al.,"Lithium recovery from highly concentrated solutions: Response surface methodology (RSM) process parameters optimization, Hydrometallurgy", 2008, vol. 90, pp. 1-7.

S. Hawash et al., "Methodology for Selective Adsorption of Lithium Ions onto Polymeric Aluminum (III) Hydroxide", Journal of American Science, 2010, vol. 6, pp. 301-309.

V.P. Isupov et al., "Synthesis, Structure, Properties, and Application of Aluminum Hydroxide Intercalation Compounds, Chemistry for Sustainable Development", 2000, vol. 8, pp. 121-127.

J. Nan et al., "Recovery of metal values from spent lithium-ion batteries with chemical deposition and solvent extraction", Journal of Power Sources, 2006, vol. 152, pp. 278-284.

(Continued)

*Primary Examiner* — Edward Johnson
(74) *Attorney, Agent, or Firm* — Fish & Tsang, LLP (57) ABSTRACT

This invention relates to a particulate extraction material for the extraction of lithium from a geothermal brine or lithium containing solution. The particulate material includes an inorganic or polymer based substrate that includes a lithium aluminate intercalate layer applied to the exterior of the substrate, wherein the lithium aluminate intercalate layer is operable to capture lithium ions from solution.

18 Claims, 6 Drawing Sheets

(56) References Cited

U.S. PATENT DOCUMENTS

| | | | |
|---|---|---|---|
| 5,594,923 A | 1/1997 | Inoue et al. | |
| 5,599,516 A | 2/1997 | Bauman et al. | |
| 5,656,172 A | 8/1997 | Kitz et al. | |
| 5,711,019 A | 1/1998 | Tomczuk et al. | |
| 5,833,844 A | 11/1998 | Leavitt | |
| 5,904,653 A | 5/1999 | Hatfield et al. | |
| 5,919,287 A | 7/1999 | Moreau | |
| 5,932,644 A | 8/1999 | Fujii | |
| 5,935,541 A | 8/1999 | Bonnet et al. | |
| 5,939,043 A | 8/1999 | Yahagi | |
| 5,951,843 A | 9/1999 | Itoh et al. | |
| 5,993,759 A | 11/1999 | Wilkomirsky | |
| 5,997,836 A | 12/1999 | Sato et al. | |
| 6,017,500 A | 1/2000 | Mehta | |
| 6,048,507 A | 4/2000 | Amouzegar et al. | |
| 6,080,696 A | 6/2000 | Duke et al. | |
| 6,103,422 A | 8/2000 | Kanai | |
| 6,139,498 A | 10/2000 | Katsman et al. | |
| 6,170,037 B1 | 1/2001 | Blumenau | |
| 6,207,126 B1 | 3/2001 | Boryta et al. | |
| 6,219,311 B1 | 4/2001 | Mitsuno | |
| 6,280,693 B1 | 8/2001 | Bauman et al. | |
| 6,458,184 B2 | 10/2002 | Featherstone | |
| 6,555,078 B1 | 4/2003 | Mehta | |
| 6,592,832 B1 | 7/2003 | Friedrich et al. | |
| 6,682,644 B2 | 1/2004 | Featherstone et al. | |
| 6,770,187 B1 | 8/2004 | Putter et al. | |
| 7,026,072 B2 | 4/2006 | Barker et al. | |
| 7,060,238 B2 | 6/2006 | Saidi et al. | |
| 7,330,914 B2 | 2/2008 | Inogai | |
| 7,390,466 B2 | 6/2008 | Boryta et al. | |
| 7,504,036 B2 | 3/2009 | Gottlieb et al. | |
| 7,678,470 B2 | 3/2010 | Yoon et al. | |
| 7,708,972 B2 | 5/2010 | Coustry et al. | |
| 7,824,766 B2 | 11/2010 | Eplee et al. | |
| 8,197,707 B2 | 6/2012 | Lefenfeld et al. | |
| 8,287,829 B2 | 10/2012 | Harrison et al. | |
| 8,309,043 B2 | 11/2012 | Alurralde et al. | |
| 8,435,468 B2 | 5/2013 | Harrison et al. | |
| 8,454,816 B1 | 6/2013 | Harrison et al. | |
| 8,518,232 B1 | 8/2013 | Harrison et al. | |
| 8,574,519 B2 | 11/2013 | Harrison et al. | |
| 8,637,428 B1 * | 1/2014 | Harrison et al. | 502/414 |
| 2001/0000597 A1 | 5/2001 | Featherstone | |
| 2001/0028871 A1 | 10/2001 | Harrison et al. | |
| 2002/0018929 A1 | 2/2002 | Dai et al. | |
| 2003/0226761 A1 | 12/2003 | Featherstone et al. | |
| 2003/0228251 A1 | 12/2003 | Boryta et al. | |
| 2004/0005267 A1 | 1/2004 | Boryta et al. | |
| 2004/0018135 A1 | 1/2004 | Adamson et al. | |
| 2004/0149590 A1 | 8/2004 | Featherstone et al. | |
| 2004/0264338 A1 | 12/2004 | Chou | |
| 2005/0011753 A1 | 1/2005 | Jackson et al. | |
| 2005/0162990 A1 | 7/2005 | Murata | |
| 2005/0227147 A1 | 10/2005 | Kogetsu et al. | |
| 2005/0265909 A1 | 12/2005 | Kajiya et al. | |
| 2006/0093911 A1 | 5/2006 | Chiga et al. | |
| 2006/0115396 A1 | 6/2006 | Boryta et al. | |
| 2006/0115407 A1 | 6/2006 | Boryta et al. | |
| 2006/0115410 A1 | 6/2006 | Boryta et al. | |
| 2007/0114134 A1 | 5/2007 | Legg et al. | |
| 2007/0148077 A1 | 6/2007 | Boryta et al. | |
| 2007/0160516 A1 | 7/2007 | Boryta et al. | |
| 2008/0068963 A1 | 3/2008 | Shikata | |
| 2008/0221440 A1 | 9/2008 | Iddan et al. | |
| 2008/0233042 A1 | 9/2008 | Boryta et al. | |
| 2008/0249395 A1 | 10/2008 | Shachar et al. | |
| 2008/0300589 A1 | 12/2008 | Paul et al. | |
| 2009/0107230 A1 | 4/2009 | Okcay et al. | |
| 2009/0214414 A1 | 8/2009 | Boryta et al. | |
| 2009/0264777 A1 | 10/2009 | Markowitz et al. | |
| 2009/0275827 A1 | 11/2009 | Aiken et al. | |
| 2010/0000597 A1 | 1/2010 | Cousins | |
| 2010/0099991 A1 | 4/2010 | Snyder | |
| 2010/0165672 A1 | 7/2010 | Li et al. | |
| 2010/0172554 A1 | 7/2010 | Kassab et al. | |
| 2010/0221613 A1 | 9/2010 | Ueki et al. | |
| 2010/0301267 A1 | 12/2010 | Mao et al. | |
| 2010/0312095 A1 | 12/2010 | Jenkins et al. | |
| 2010/0312096 A1 | 12/2010 | Guttman et al. | |
| 2010/0327223 A1 | 12/2010 | Zaghib et al. | |
| 2011/0044882 A1 | 2/2011 | Buckley et al. | |
| 2011/0123427 A1 | 5/2011 | Boryta et al. | |
| 2011/0142316 A1 | 6/2011 | Wang et al. | |
| 2011/0200508 A1 | 8/2011 | Harrison et al. | |
| 2012/0235084 A1 | 9/2012 | Lefenfeld et al. | |

FOREIGN PATENT DOCUMENTS

| | | |
|---|---|---|
| CN | 1558871 | 12/2004 |
| DE | 19631794 A1 | 7/1997 |
| DE | 19809420 A1 | 9/1999 |
| EP | 0094983 A1 | 11/1983 |
| EP | 0103035 A1 | 3/1984 |
| EP | 0117316 A1 | 9/1984 |
| EP | 1900688 A1 | 3/2008 |
| GB | 895690 | 5/1962 |
| GB | 2190668 A | 11/1987 |
| JP | 5173932 | 7/1993 |
| JP | 2004225144 A | 8/2004 |
| JP | 2006318815 | 11/2006 |
| JP | 2009046390 | 3/2009 |
| JP | 2009057278 | 3/2009 |
| RU | 2009714 | 3/1994 |
| RU | 1729027 | 11/1994 |
| RU | 2050330 | 12/1995 |
| RU | 2157338 | 10/2000 |
| RU | 2193008 | 11/2002 |
| RU | 2243157 C2 | 2/2003 |
| RU | 2232714 | 7/2004 |
| WO | 9419280 | 9/1994 |
| WO | 9929624 | 6/1999 |
| WO | 0078675 | 12/2000 |
| WO | 03041857 | 5/2003 |
| WO | 2003037794 A1 | 5/2003 |
| WO | 2006094968 A1 | 9/2006 |
| WO | 2009131628 | 10/2009 |

OTHER PUBLICATIONS

K. Fujii, "Dependence of adsorptive capability for lithium ions in molten salt on surface properties of activated alumina", Nippoo Seramikkusu Kyokai Gakujutse Ronbunshi, 1994, vol. 102, p. 12.

V.I. Samoilov et al., "Extracting Lithium from Waste Solutions of Chemico-Metallurgical Lithium Carbonate Production", Theoretical Foundations of Chemical Engineering, 2008, vol. 42, No. 5, pp. 714-717.

Yang, "Optimization of operation conditions for extracting lithium ions from calcium chloride-type oil field brine", International Journal of Minerals, Metallurgy, and Materials, 2012, vol. 19, Issue 4, pp. 290-294.

Yokoyama, Takushi, et al., A Study of the Alumina-Silica Gel Adsorbent for the Removal of Silicic Acid from Geothermal Water: Increase in Adsorption Capacity of the Adorbent due to Formation of Amorphous Aluminosilicate by Adsorption of Silicic Acid, J. of Colloid and Interface Science, 2002, pp. 1-5, vol. 252, Elsevier, US.

Bloomquist, R. Gordon, Economic Benefits of Mineral Extraction from Geothermal Brines, Proceedings of the Sohn International Symposium, 2006, pp. 553-558, vol. 6, WA, US.

Bouguerra, W., et al., Equilibrium and kinetic studies of adsorption of silica onto activated alumina, Desalination, 2007, pp. 141-146, vol. 206, Elsevier, US.

Chiba, Removal of Arsenic and Silicon Dioxide Contained in Industrial Waste Water, 1980.

Cole, Peter, et al., Zinc Solvent Extraction in the Process Industries, Mineral Processing and Extractive Metallurgy Review, 2003, pp. 91-137, vol. 24, AF.

Dreisinger, David, et al., New Developments in the Boleo Copper-Cobalt-Zinc-Manganese Project, 2006, Alta, pp. 1-36, Baja Mining Corp., US.

Gallup, Darrell, et al., Laboratory investigation of silica removal from geothermal brines to control silica scaling and produce usable silicates, Applied Geochemistry, 2003, pp. 1597-1612, vol. 18, Elsevier, US.

(56) References Cited

OTHER PUBLICATIONS

Gallup, D. L., et al., Heavy Metal Sulfide Scaling in a Production Well at the Salton Sea Geothermal Field, Geothermal Resources Council Transactions, 1990, pp. 1583-1590, vol. 14, Part II, US.

Gotfryd, Leszek, et al., Recovery of Zinc(II) From Acidic Sulfate Solutions, Simulation of Counter-Current Extraction-Stripping Process, Physicochemical Problems of Mineral Processing, 2004, pp. 113-120, vol. 38.

Hamzaoui, Lithium recovery from highly concentrated solutions: Response surface methodology (RSM) process parameters optimizations, Hydrometallurgy, 2008, pp. 1-7, vol. 90, UK.

Kawai, Toshihide, et al., Solvent Extraction of Zinc(II) and Manganese(II) with 5,10,15,20-Tetraphenyl-21H,23H-Porphine (TPP) through the Metal Exchange Reaction of Lead(II)-Tpp, Solvent Extraction Research and Development, 2000, pp. 36-43, vol. 7, Japan.

Ku, Young, et al., The Adsorption of Fluoride ION From Aqueous Solution by Activated Alumina, Water, Air, and Soil Pollution, 2002, pp. 349-360, vol. 133, Netherlands.

Lee, Man, et al., Solvent extraction of Zinc from Strong hydrochloric acid solution with alamine 336, 30(7) Bull Korean Chem. Soc. (2009), pp. 1526-1530, Korea.

Manceau, Alain, et al., Nanometer-sized, divalent-MN, hydrous silicate domains in geothermal brine precipitates, American Mineralogist, 2005, pp. 371-381, vol. 90, US.

Pascua, Chelo, et al., Uptake of dissolved arsenic during the retrieval of silica from spent geothermal brine, Geothermics, 2007, pp. 230-242, vol. 36, Elsevier, US.

Potapov, V.V., et al., Experiments on Silica Precipitation from Hydrothermal Solution and Utilization of Precipitated Material, Thirtieth Workshop on Geothermal Reservoir Engineering, 2005, pp. 1-9, Stanford, US.

Potapov, V.V., Silica Precipitation From Hydrothermal Solution, Journal of Mining Science, 2004, pp. 101-112, vol. 40, US.

Prokuyev, Mutual Influence of Zinc(II) and Cadmium (II) in Case of Extraction from Lithium Chloride Solutions with Tributyl Phosphate.

Pyman, The point of zero charge of amorphous coprecipitates of silica with hydrous aluminium of ferric hydroxide, Clay Minerals, 1979, pp. 87-92, vol. 14, US.

Ryabstev, A.D., et al., Preparation of High-Purity Lithium Hydroxide Monohydrate from Technical-Grade Lithium Carbonate by Membrane Electrolysis, Russian Journal of Applied Chemistry, 2004, pp. 1108-1116, vol. 77, No. 7, Russia.

Schultze, Techniques for Recovering Metal Values From Postflash Geothermal Brines, Trasnactions Geothermal Resources Council, 1984, pp. 2-5, vol. 8, Bureua of Mines, Reno, Nevada.

Schultze, L.E., Operation of a Mineral REcovery Unit on Brine From the Salton Sea Known Geothermal Resource Area, Report of Investigations 8680, Bureau of Mines, 1982, pp. 1-12, vol. 506, US.

Sheikholeslami, R., et al., Silica and metals removal by pretreatment to prevent fouling of reverse osmosis membranes, Desalination, 2002, pp. 255-267, vol. 143, Elsevier, US.

Song, et al., Temperature-dependent properties of $FePO_4$ cathode materials, Materials Research bulletin, 37, 2002, 1249-1257, US.

Topracki, Fabrication and Electrochemical Characteristics of $LiFePO_4$ Powders for Lithium Ion Batteries, Kona Powder and Particles Journal, 2001, vol. No. 26, pp. 50-73, US.

Umetani, Solvent Extractions of Lithium and Sodium with 4-Benzoyl or 4-Perfluoracyl-5-Pyrazolone and Topo, Talanta, 1987, pp. 779-782, vol. 34, No. 9, Pergamon Journals Ltd., Great Britian.

Wilcox, Selective lithium ion extraction with chromogenic monoaza crown ethers, Analyica Chimica Acta, 1991, pp. 235-242, vol. 245, Elsevier Science Publishers, B.V., Amserdam.

\* cited by examiner

LITHIUM EXTRACTION COMPOSITION AND METHOD OF PREPARATION THEREOF

RELATED APPLICATIONS

This application is a Continuation of application Ser. No. 12/972,728 filed on Dec. 20, 2010, which claims priority to U.S. Provisional Patent Application Ser. No. 61/287,983, filed on Dec. 18, 2009, which is incorporated herein by reference in its entirety.

BACKGROUND OF THE INVENTION

1. Technical Field of the Invention

The invention generally relates to the field of selectively removing and recovering lithium from solution. More particularly, the invention relates to methods and compositions for the selective removal and recovery of lithium ions from a lithium ion containing solution, preferably without the removal of measurable quantities of other ions from the solution, in particular as related to lithium containing brines.

2. Description of the or Art

Approximately 75 to 80% of lithium chloride and lithium carbonate and their derivatives are commercially produced from the recovery of lithium from brines, typically via natural evaporative processes. The invention described herein is applicable to these and other brine sources. The invention described herein is also equally applicable to high ionic strength solutions that include lithium.

Geothermal brines are of particular interest for a variety of reasons. First, some geothermal brine provide a source of electrical power due to the fact that hot geothermal pools are stored at high pressure underground, which when released to atmospheric pressure, can provide a flash-steam. The flash-stream can be used, for example, to produce energy to run a power plant. In some geothermal waters and brines, associated binary processes can be used to heat a second fluid, which can provide steam for the generation of electricity without the flashing of the geothermal brine. Additionally, geothermal brines contain various useful elements, which can be recovered and utilized for secondary processes.

It is known that geothermal brines can include various metal ions, particularly alkali and alkaline earth metals, as well as transition metals such as lead, silver, manganese and zinc, in varying concentrations, depending upon the source of the brine. Recovery of these metals is potentially important to the chemical and pharmaceutical industries. Typically, the economic recovery of metals from natural brines, which may vary widely in composition, depends not only on the specific concentration of the desired metal, but also upon the concentrations of interfering ions, particularly calcium and magnesium, because the presence of the interfering ions will increase recovery costs as additional steps must be taken to remove the interfering ions.

As lithium has gained importance as an element for use in various applications, such as for use in batteries, research has been conducted to develop simple and inexpensive methods for the recovery thereof. For example, Burba previously developed two- and three-layer lithium aluminates for the recovery of lithium from brines. (See, for example, U.S. Pat. Nos. 4,348,295 and 4,461,714). The prior art methods that employ packed columns for the recovery, however, suffer from many drawbacks, such as shortened lifetimes due to the slow deterioration and disintegration of the particles and an overall low operating capacity for the removal of lithium.

Thus, there exists the need for the development of new and improved synthetic methods and materials for the selective and efficient recovery of lithium from lithium containing brines (i.e., recovery of at least about 95% of the lithium present in a solution) that are easy to use, have a high capacity for the recovery of lithium, and have a long service life.

SUMMARY OF THE INVENTION

Methods for the selective removal of lithium from lithium containing solutions, such as brines, geothermal brines; salar (salt flat) brines, continental brines, including Smackover brines, oilfield brines, and high ionic strength solutions are provided herein. Also provided are methods for preparing extraction compositions for the recovery of lithium from lithium containing solutions.

In one embodiment, a composition for the recovery of lithium from lithium containing solutions is provided. The substrate includes a lithium aluminate intercalate coating applied to the surface of the substrate, wherein the coating is applied by contacting a polyaluminum hydroxyl halide solution and the substrate in the presence of alkali metal hydroxide, thereby precipitating the lithium aluminate intercalate onto the substrate surface.

In one embodiment, a method for preparing a composition for the recovery of lithium from a lithium containing solution is provided. The method includes the steps of providing a particle substrate; contacting the particle substrate with poly aluminum hydroxyl halide to form an aluminum hydroxide coated particle substrate; and intercalating a lithium salt into the alumina coating on the particle substrate to form a lithium aluminate intercalate.

In certain embodiments, the particle substrate is selected from the group consisting of inorganic and polymeric materials. In certain embodiments, the particle substrate can be porous. In certain embodiments the particle substrate can be diatomaceous earth (predominantly silica based), iron oxide or alumina. In certain embodiments, the particle substrate can be activated alumina. In certain embodiments, the particle substrate can be a resin based material. The poly aluminum hydroxyl halide can be poly aluminum hydroxyl chloride. The lithium salt intercalated into the poly aluminum hydroxyl halide coated particle substrate can be lithium hydroxide or lithium chloride. In certain embodiments, the step of intercalating the lithium salt into the poly aluminum hydroxyl chloride can include contacting the poly aluminum hydroxy chloride coated particle substrate with an alkaline hydroxide, and then contacting the coating with lithium salt.

In another embodiment, a composition for the recovery, of lithium from a lithium containing solution is provided. The composition can include a substrate having a poly aluminum hydroxyl halide coating applied thereto, wherein the poly aluminum hydroxyl halide coating comprises lithium chloride intercalated therein. In certain embodiments, the substrate can be selected from the group consisting of an inorganic material or a polymeric material. In certain embodiments, the substrate can be porous. In certain embodiments, the substrate can be diatomaceous earth. In other embodiments, the substrate can have an average particle size of less than about 1000 μm and an average pore size of less than about 5 μm. In other embodiments, the ratio of alumina to lithium is between about 1:0.1 and 1:0.6. In certain embodiments the poly aluminum hydroxyl halide is poly aluminum hydroxyl chloride.

In another embodiment, a method for the removal and recovery of lithium from lithium containing solutions is provided. The method can include the steps of contacting a lithium containing solution with a granular extraction material, wherein the granular extraction material includes a porous inorganic substrate having a lithium aluminate intercalate coating applied thereto, wherein the step of contacting the lithium containing solution and the lithium aluminate intercalate coating results in the removal of at least a portion of the lithium present in the lithium containing solution and the capture of said lithium by said coating; and recovering the captured lithium by washing the granular extraction material with a wash water, wherein said wash water has a lithium concentration of less than about 200 ppm.

DETAILED DESCRIPTION OF THE INVENTION

Broadly, in one aspect, methods of preparing novel compositions of optionally lthiated intercalates of aluminum hydroxide on an inorganic support for the extraction of lithium salts, particularly lithium halides, from solutions and brines that include said lithium salts are described herein. As used herein, lithium salts include lithium nitrates, lithium sulfates, lithium bicarbonate, lithium halides (particularly chlorides and bromides), and acid salts. In addition, in another aspect, novel methods for the selective extraction of lithium halides from solutions and brines that include said lithium halides are described herein. Finally, in another aspect, a novel composition that includes a granular form of lithium aluminate on an inorganic support is provided.

Composition

The present invention, in one aspect, provides a method for preparing novel compositions of lithiated granular aluminum intercalates of lithium salts which are deposited on a variety of solid supports. As used herein, a solid support upon which a lithium aluminate intercalate (hereinafter, "LAI") coating has been deposited may be referred to as LAI-S. Generally, the LAI has the chemical formula ($LiAl_2(OH)_6X.H_2O$), wherein X is generally defined as organic or inorganic anion, such as a halide. In certain embodiments, the substrate can be an inorganic material. Exemplary inorganic support materials can include silica, alumina, activated alumina, iron oxide, titania, zirconia, metal oxide, metal silicate, metal aluminate, metal phosphate, metal sulfate and metal hydroxide particles. In certain embodiments, the support material can be a zeolitic material or clay. In certain embodiments, the support material is a refractory metal oxide. In alternate embodiments, the support material can be a diatomaceous earth. In alternate embodiments, the substrate can be a polymer or resin based material, such as polyethylene or polypropylene. In yet other embodiments, the materials can be a carbon based material. In general, it is desired that the poly aluminum hydroxides have a high affinity to bind to the substrate. In certain embodiments, it can be advantageous that the substrate is a porous material.

In certain preferred embodiments, the support material can be porous. Alternatively, the support material can have a relatively high surface area, for example having a surface area greater than about 200 $m^2/g$, alternatively at least about 500 $m^2/g$. In other embodiments, the support material can have an average particle diameter of between about 1 and 1000 μm, alternatively between about 1 and 200 μm; or alternatively between about 1 and 100 μm. In alternate embodiments, the support material has an average particle diameter of less than about 75 μm. In certain other embodiments, the support material has an average particle diameter of between about 100 and 500 μm. In yet alternate embodiments, the support material has an average particle diameter of between about 25 and 80 μm.

The porous support material can have a pore having a diameter size of between about 0.01 μm and 20 μm, preferably between about 0.1 μm and 10 μm, and most preferably between about 0.1 μm and 5 μm. In certain embodiments, the support material can have a relatively wide pore size, for example, having pores having a diameter of up to about 5 μm. In other embodiments, the support material can have a relatively small pore size, for example, having pores having a diameter of between about 0.1 μm and 0.6 μm. In certain embodiments, wherein the support material is a diatomaceous earth, the pore size may be between about 1 μm and about 5 μm, or alternatively greater than about 5 μm. In alternate embodiments, the pores can be up to about 5 μm in diameter. In yet other alternate embodiments, the support material can be a neutral activated alumina having a particle size ranging from about 50 μm to 400 μm and a pore size of about 5 nm. In embodiments that employ porous materials, the coating adheres to the exterior surface of the support material, as well as the interior surface of the pores, thereby increasing the surface area to which the coating is applied.

In one embodiment, the porous materials can include diatomaceous earth. One exemplary manufacturer of diatomaceous earth includes EP Minerals (USA). Two exemplary products from EP Minerals suitable for use in the present invention include Celatom MP-78 and FW-80. Certain exemplary diatomaceous earth products suitable for use in the present invention can have a silica content of at least about 85% by weight and an alumina content of between about 3.5% and 7% by weight.

Figure 2:
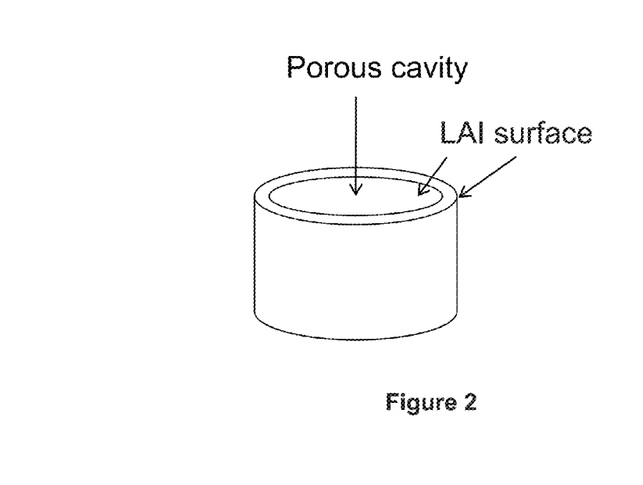
FIG. 2 is a schematic illustration demonstrating deposition of a lithium aluminate intercalate layer on a porous substrate according to one embodiment of the present invention.

In certain embodiments, porous materials can be used as the solid support material for the LAI-S composition. In certain embodiments, porous materials may offer certain advantages, such as an increased surface area. In certain embodiments, the porous materials contemplated for use herein have a surface area of at least about 100 $m^2/g$, alternatively at least about 200 $m^2/g$. As shown, for example, in FIG. 2, the coating of a porous material provides increased surface area for the subsequent deposition of the LAI extractant composition, which can be beneficial for the extraction of lithium from lithium containing solutions as the increased surface area of the substrate increases the amount of active area of each particle being used for the extraction of lithium. In certain embodiments, the porous material can be a diatomaceous earth. In operation, the brine or salt containing solution flows through intra and interparticle pores within the porous material. Increased surface area, and increased lithium extraction capacity, helps to prevent loss of lithium ions.

Figure 3:
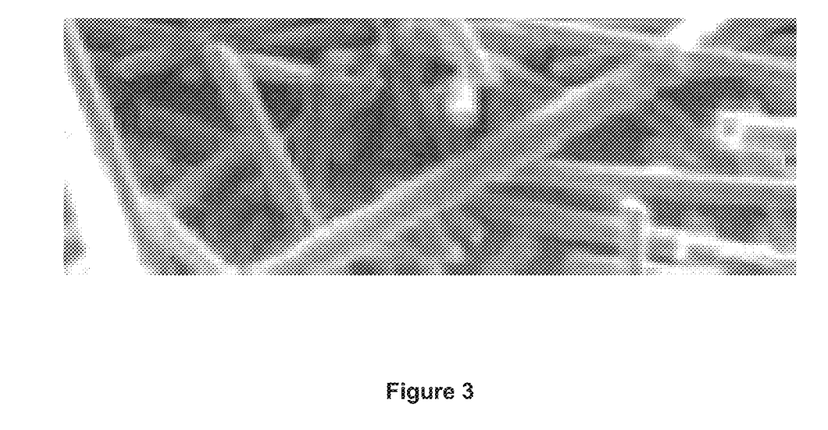
FIG. 3 is an SEM image of fibers suitable as a solid support for an lithium aluminate intercalate layer according to one embodiment of the present invention.
Figure 4:
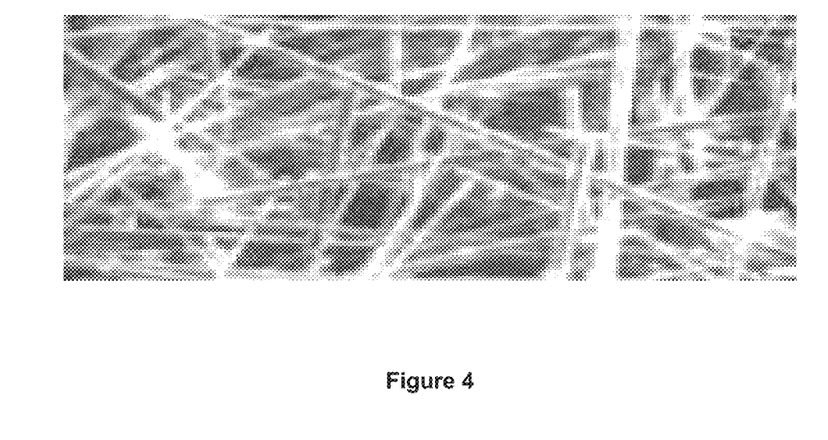
FIG. 4 is an SEM image of fibers suitable as a solid support for an lithium aluminate intercalate layer according to one embodiment of the present invention.
Figure 5:
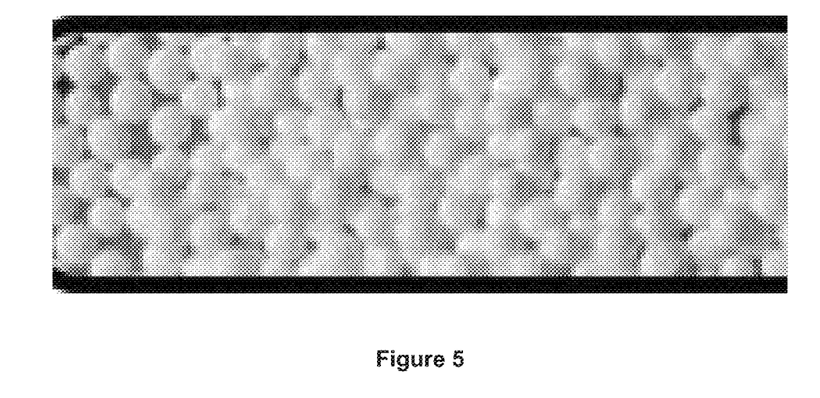
FIG. 5 is an SEM image of silica gel beads suitable as a solid support for an lithium aluminate intercalate layer according to one embodiment of the present invention.
Figure 6:
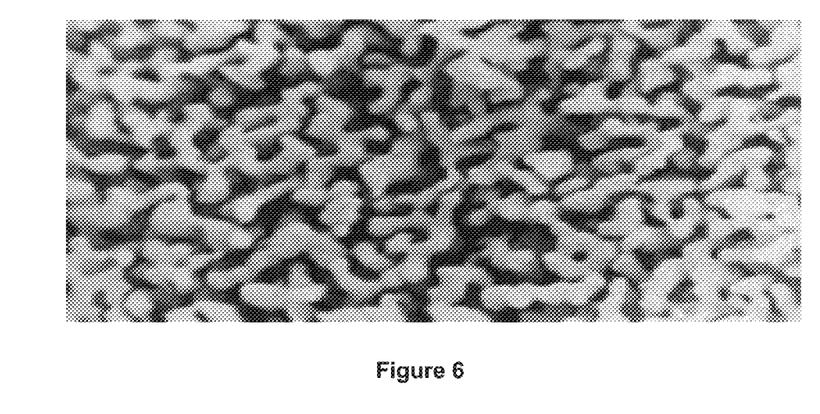
FIG. 6 is an SEM image of silica gel beads suitable as a solid support for an lithium aluminate intercalate layer according to one embodiment of the present invention.
Figure 7:
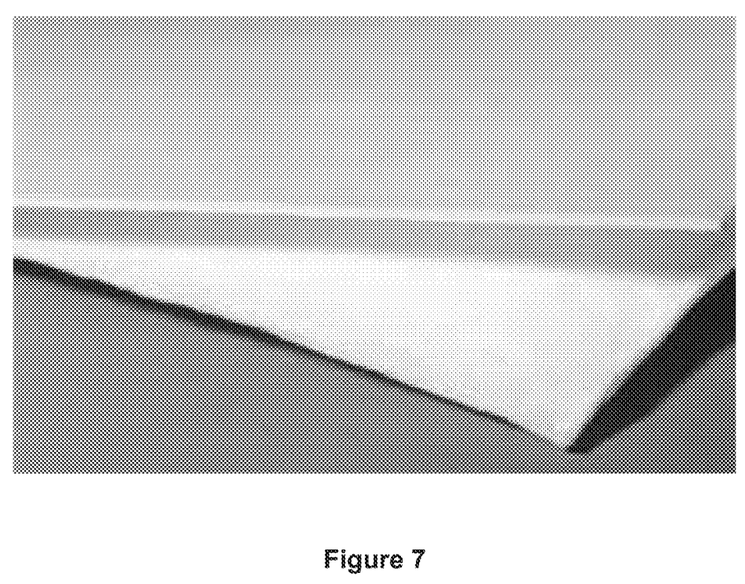
FIG. 7 is an SEM image of porous inorganic or ceramic papers suitable as a solid support for an lithium aluminate intercalate layer according to one embodiment of the present invention.
Figure 8:
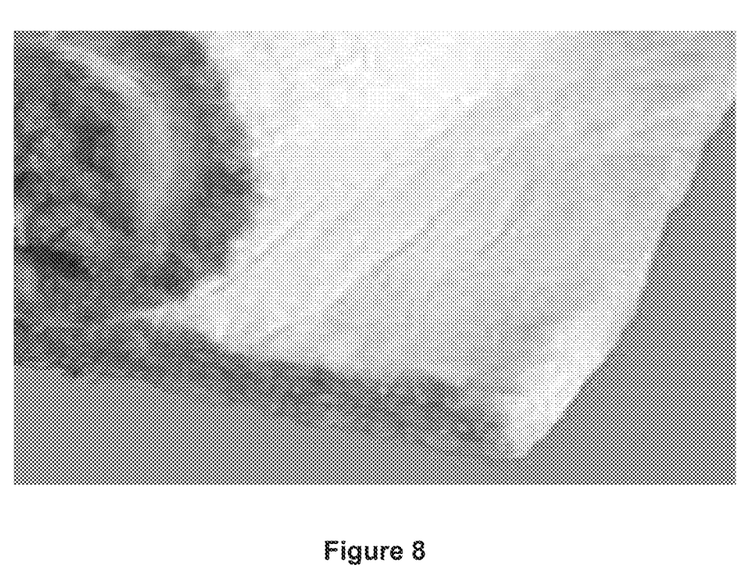
FIG. 8 is an SEM image of porous inorganic or ceramic blankets suitable as a solid support for an lithium aluminate intercalate layer according to one embodiment of the present invention.

In certain embodiments, the use of inorganic/refractory support materials as a solid support for the LAI-S composition may provide several advantages over possible polymeric/resin based materials for depositing fine particles of LAI. For example, inorganic/refractory support materials are typically less expensive, provide easier use during synthesis, and have both chemical and physical stability that can be superior to that of many of the polymeric materials that can be used as support materials. FIGS. 3-5 provide some scanning electron micrographs of several exemplary and readily available silica, alumina, and refractory based materials in different forms, sizes and shapes. For example, FIGS. 3 and 4 provide fibers having dimensions ranging from about 0.5 μm to about 1 mm. FIGS. 5 and 6 provide silica gel beads having dimensions ranging from about 1 μm to about 1000 μm. FIGS. 7 and 8 provide porous papers or blankets which are made up of fibers that may subsequently be coated with the aluminum hydroxide and intercalated with a lithium salt. In certain embodiments, the methods of the present invention can be used to prepare aluminum intercalates coated on blankets made up of silica or alumina fibers, or large scale porous products that include silica or alumina.

The present invention, in certain embodiments, also contemplates various inorganic, ceramic, and/or refractory materials for use as solid supports for the LAI-S material. In certain embodiments, the materials can be carbon based fibers, particles, and/or tapes. Potential solid supports for depositing LAI/extracting lithium can take a variety of shapes, for example, fibers, strings, porous particles, solid particles, thin papers, films or membranes, and porous papers/blankets. For example, as shown in FIGS. 3 and 4, inorganic fibers can be used as a solid support for the LAI-S. Exemplary fibers for use in certain embodiments disclosed herein include silica fibers from Fibertec, Inc. (USA). Exemplary fibers can have a length of up to about 210 μm and an average diameter of between about 1 and 5 μm, alternatively up to about 10 μm. In certain embodiments, exemplary fibers for use herein can have an aspect ratio (i.e., the ratio of the length to the diameter of the particle) of between about 5:1 and 20:1.

As shown in FIGS. 5 and 6, silica gel beads with tunable pore size distribution (as determined by the chemical properties of the material used as the substrate) can be used as a substrate for the deposition of the LAI composition. In certain embodiments, the pore size distribution can be varied from about 5 nm to about 5 μm. An exemplary silica gel that can be used in the present invention is Silica Gel (grade SG 10) from Makall industries (China), and similar material available from Microsolv Technology (USA), which is claimed to have a pore size that ranges from about 0.6 μm to about 1 μm and an overall particle size of between about 100 and 1000 μm.

As shown in FIGS. 7 and 8, certain other potential substrates for use as solid supports for the composition can include polymeric/porous membranes, porous inorganic or ceramic papers (FIG. 7) and blankets (FIG. 8). For example, the LAI-S composition can readily be applied, deposited, and/or integrated into polymeric membranes to generate lithium ion transporting membranes. Exemplary materials can include porous ceramic papers; boards, tapes and blankets, such as are available from Cotronics Corp. (USA). For example, ceramic porous blankets can be produced from long ceramic fibers, which may be cross-linked for additional strength. Suitable cross-linkers for cross-linking the ceramic fibers are known in the art.

Without wishing to be bound by any specific theory, it is believed that the energy barrier for dynamic adsorption and desorption of lithium ions increases proportionately with increasing particle sizes. Put differently, the removal of lithium ions may be easier and more spontaneous from locations at or relatively near to the surface of the LAI-S particles (at certain defined temperature, pH and ionic concentration), as compared with the removal of lithium ions that are trapped deeper within the LAI-S particles; or within certain LAI-S particles that include a matrix that includes the LAI composition and a polymer. Furthermore, the platelet geometry of LAI particles (e.g., thickness, and dimensions thereof) and their relative orientation can influence the lithium loading capacities of the resulting adsorbent material. The LAI-S synthesis described herein offers greater flexibility in controlling crystal growth and platelet dimensions and thereby improving the performance of the materials.

Other suitable substrates for use can include glass fibers (such as the glass fibers produced by Fibertec, Inc.; USA), preferably having an average length of up to about 2 μm and an average diameter of up to about 10 μm. Alternatively, the solid substrate can be sand particles having art average diameter of between about 50 and 70 mesh. In alternate embodiments, Ludox particles (available from W.R. Grace & Co.; U.S.), a mixture of lithium polysilicate and various inorganic components (such as, carbon black, titanium dioxide, and the like) can be utilized with a polymeric material as a coating for the surface thereof.

Deposition

In one embodiment of the present invention, an LAI layer can be deposited or precipitated on a support material. Specifically, in the presence of a base, the $LiAl_2(OH)_6X \cdot nH_2O$, (wherein X can be an organic or inorganic anion, and n is between 0 and 2) is deposited on the support material, which is preferably an inorganic support. In certain embodiments, materials can be used for the support material that have strong chemical affinity to bind with LAI on their respective surfaces, such as silica based materials that readily bind with LAI or precursors of LAI.

In certain embodiments, the surface of the inorganic or polymer or resin-based substrate can be treated prior to impregnation or attachment of the LAI to the substrate surface. One exemplary surface treatment is poly aluminum hydroxyl chloride ("PAC"). Generally, upon exposure of the PAC to the surface of the substrate, a thin coating of poly aluminum hydroxide is formed on the surface, and may alter the surface charge. The PAC, upon reacting with a base, such as an alkali hydroxide, preferably lithium hydroxide, allows the LAI material to deposit on the substrate of interest. If the surface of the substrate, preferably either an inorganic or polymeric substrate, does not bind with the PAC or other precursor of aluminum hydroxide, the surface can optionally be pre-treated with various materials that more readily bind with PAC or the related precursors, such as polymers having acidic functional groups, silicate/phosphate based binders that alter the surface properties, or certain silane compounds. Without wishing to be bound by any specific theory, pretreatment of the substrate surface is believed to facilitate crystallization or precipitation of fine particles of LAI-Cl onto the substrate surface, thereby providing a coating on the surface of the substrate.

In certain embodiments, the LAI-S can be a layered material that can adopt a platelet morphology. Platelet size and thickness, however, may vary depending upon specific synthesis conditions and may require optimization of the synthetic conditions to obtain certain preferred platelet geometries of the materials. For example, in one embodiment, wherein lithium chloride is intercalted into a gibbsite substrate (i.e., Al(OH)$_3$), larger platelets that include lithium are formed (of a gibbsite/LAI material), while the overall morphology of the gibbsite is preserved. In contrast, intercalation of lithium hydroxide into a gibbsite substrate typically leads to fine particles formation. Without wishing to be bound by any one theory, it is believed that with respect to intercalation with lithium hydroxide, the alkaline nature of lithium hydroxide may lead to at least partial, if not complete, dissolution of aluminum hydroxide and re-precipitation of the LAI-S composition.

In addition to particle morphology, the synthetic conditions for the deposition of the LAI composition on the solid support may also influence the resulting crystal/molecular structure of the resulting LAI-S particle. For example, in certain embodiments, the synthetic conditions may influence the hydration levels (i.e., amount of water that is incorporated within the crystal structure), and the nature of stacking of the elementary crystal planes (which defines the LAI structural polymorph). The process of extracting lithium from hot and/or high ionic strength geothermal brines is typically driven by subtle equilibrium conditions that exist between lithium ions in solution and lithium ions in the solid state. Thus, both the crystal structure of lithium aluminate intercalate layers and particle size and/or particle morphology may also play a role in influencing the lithium ion loading and unloading properties of the extraction composition.

In certain embodiments, it is conceivable that a higher surface area (i.e., small and/or porous particles having a surface area of at least about 10 m$^2$/g having the LAI composition deposited thereon) can enhance the ability to extract lithium from geothermal brines efficiently. The use of fine particles (i.e., particles having a diameter of less than about 10 μm) in a column, however, may not be practical, as the fine particles can, in certain instances, hinder the flow of liquids and, thus, may create high backpressures within the extraction equipment. Therefore, deposition of fine particles of LAI for example, LAI particles having a diameter of less than about 5 μm) onto a solid support (e.g., inorganic or polymeric substrates) having an average diameter of at least about 50 μm becomes an attractive option and avoids the problems associated with high backpressures. The use of the larger inorganic or polymer substrates also allows for the composition to have the properties associated with the line LAI particles (such as the high surface area), while also having a large enough overall size to eliminate or reduce the likelihood of hindering the brine flow and the resulting high backpressure.

In certain embodiments, the present invention provides a method for the deposition of fine LAI particles onto various inorganic or polymeric substrates. As used herein, in reference to LAI particles, fine particles refers to particles having an average diameter of less than about 10 μm, preferably less than about 5 μm. As noted herein, in certain preferred embodiments, the substrates have a relatively high surface area.

In other embodiments, substrate materials can be carbon based fibers, particles, and or tapes.

In yet another embodiment, the substrate can be a monolithic and highly porous structure fabricated from alumina, silica, or any other suitable material upon which the PAC or PAC precursor can be stably deposited. Optionally, the monolithic surface can be pretreated, as may be necessary, to improve deposition of the PAC or PAC precursor. Exemplary, monolithic substrates are produced by Koch-Glitsch and Refractron Technologies Corp., although it is understood that other manufacturers may also produce suitable substrates.

In certain embodiments, the high surface area particles may have structures or frameworks that can be used to maximize the lithium ion extraction capability of the composition. Preferably, the structure or framework maximizing surface area does not adversely affecting the overall physical stability of LAI composition or the flow of the brine or lithium containing solution.

Figure 1:
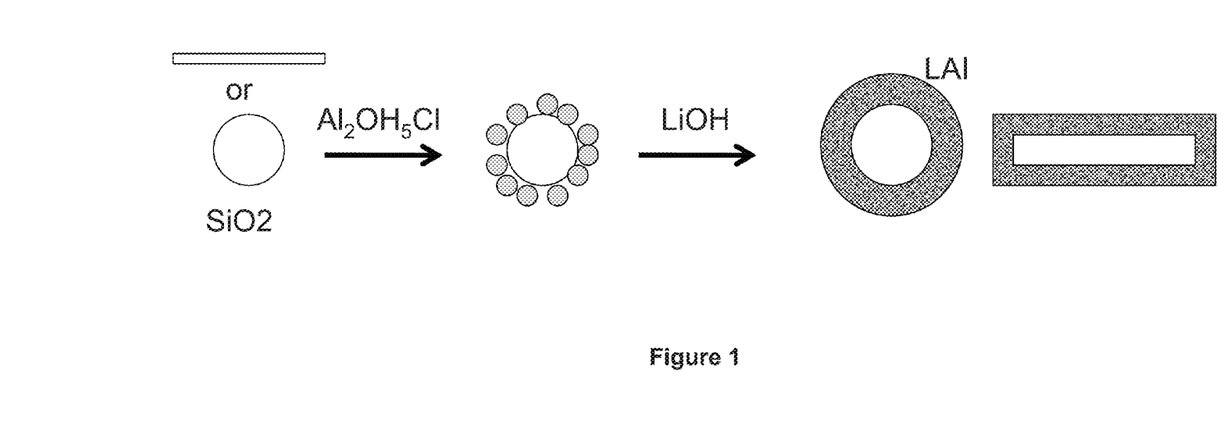
FIG. 1 is a schematic illustration demonstrating the deposition of lithium aluminate intercalate layer on an inorganic substrate according to one embodiment of the present invention.

Referring now to FIG. 1, a schematic illustration demonstrating the deposition of an LAI layer on a solid silica substrate is provided. It is understood that the procedure may also be followed for polymer or other inorganic substrates, such as alumina. The silica substrate, which is shown in the Figure as having either a round or planar structure, is contacted with Al$_2$(OH)$_5$Cl (poly aluminum hydroxyl chloride, hereinafter "PAC"), which deposits upon the outer surface of the substrate. The substrate and PAC deposited thereon are then contacted with a solution that includes lithium hydroxide. Upon contact, the lithium hydroxide then intercalates within the deposited PAC, thereby forming an LAI layer on the surface of the substrate. The general formula for PAC is Al$_2$(OH)$_a$(Cl)$_b$, wherein a+b=6, and a and b are each between 1 and 5. Preferably, a is 3 or greater. This reaction is provided in Scheme 1.

$$SiO_2 + Al_2OH_5Cl \rightarrow [SiO_2(Al_2OH_5Cl)] + LiOH \rightarrow LiAl_2(OH)_6O \qquad \text{Scheme 1.}$$

In one embodiment, a single pot synthesis of the LAI-S composition is provided, wherein the synthesis proceeds by controlling the sequence of the addition of the various reactants and the amount of various reactants that are to be added. In alternate embodiments, known methods of synthesizing LAI (e.g., the intercalation of lithium into aluminum hydroxide) can be used to deposit LAI-Cl on solid inorganic support materials, (such as silica) and other related inorganic support materials.

Figure 9:
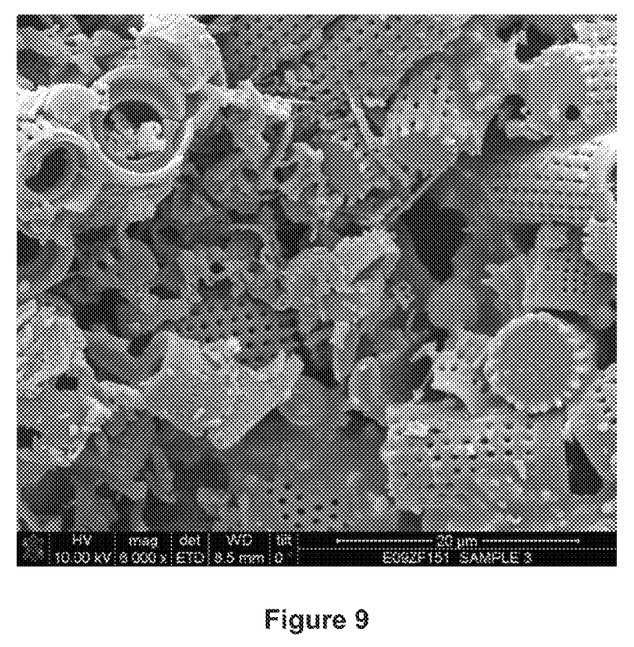
FIG. 9 is an SEM image of a diatomaceous earth sample that has not been impregnated with lithium aluminate intercalate.
Figure 10:
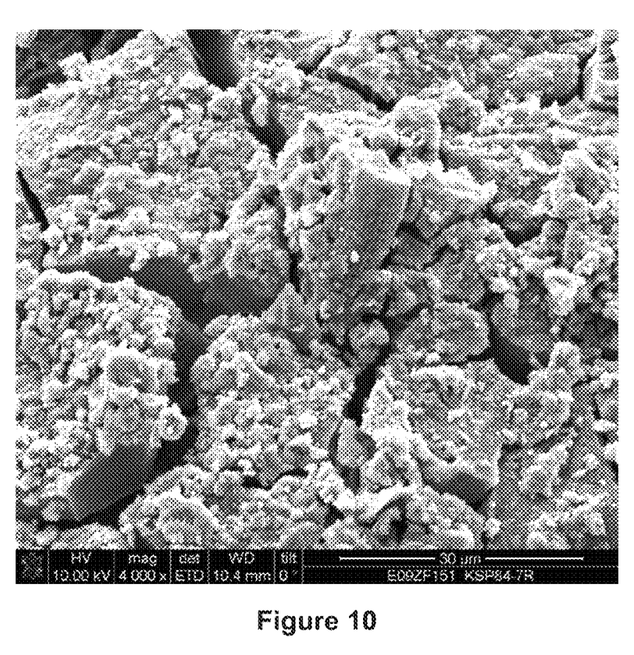
FIG. 10 is an SEM image of a diatomaceous earth sample impregnated with lithium aluminate intercalate.

For example, in one embodiment, the one pot synthesis of a solid supported LAI-S composition proceeds as follows. A solid substrate is provided and to that substrate is added a minimum of 1:1 weight ratio of 50% by weight solution of PAC. Preferably, a 1:4 weight ratio of substrate to PAC solution is utilized. As the amount of PAC increases, the amount of LAI-S deposited on surface increases and reaches a steady state, above which addition of PAC will not increase the amount of LAI deposited on the substrate. In certain embodiments, the amount of LAI deposited on a substrate can be increased by repeatedly depositing PAC on samples of dried LAI-S (i.e., the sample is completely dried in between each deposition). For example, to approximately 20.0 g of diatomaceous earth, FW80 (from EP minerals Inc.), approximately 90 g of 50% by weight PAC solution (about 0.42 moles of Al, KPAX-XL 19 from Kemira) was added slowly. Approximately 88 g of a 5.7% by weight lithium hydroxide containing aqueous solution (0.21 moles of Li) was added dropwise while stirring at room temperature. The lithium hydroxide was titrated to a pH of between about 5 and 9, preferably to a pH of between about 6 and 8. After allowing intercalation of the lithium hydroxide into the alumina coating on the solid substrate, a thick gel type structure is formed. To this gel, approximately 11.2 g of lithium chloride (0.26 moles) was added to promote lithium intercalation and to break the gel structure to form a uniform slurry. The slurry was maintained in an oven at 70° C. overnight to complete the reaction and dry the sample. The dried sample was washed with 300 mL of water at room temperature to remove fines and excess amount of lithium chloride that may present. FIG. 9 provides an SEM micrograph of uncoated diatomaceous earth particles. FIG. 10 provides diatomaceous earth particles that have been coated with the LAI material.

Similarly, a single pot synthesis of an LAI impregnated diatomaceous earth is provided. Diatomaceous earth and poly aluminum hydroxyl chloride ($Al_2(OH)_5Cl$) are combined and thoroughly mixed. To the mixture, at room temperature, is added lithium chloride (in a molar amount equivalent to the amount of aluminum present in the poly aluminum hydroxyl chloride sample). Following stirring for about 30 min, the reactant shiny was titrated with a 5.7% by weight solution of lithium hydroxide until a pH of between about 5 and 8 is achieved (approximately 1.0 molar equivalents added).

In a similar fashion, silica, iron oxide, or alumina particles, fibers, or porous membranes may be coated. Generally, the particles or fibers are combined with PAC or a PAC precursor and thoroughly mixed. To the mixture is added an alkali sail, preferably an alkali halide. An exemplary alkali salt is lithium chloride. Typically, the alkali halide is added in a molar equivalent to the amount of aluminum present in the PAC sample. The PAC coated particles can then be titrated with lithium hydroxide to a pH of between about 5 and 9, dried, washed and collected.

Extrusion of Particles

In certain embodiments, a particulate extraction media can be prepared by supplying a mixture that includes PAC or a PAC precursor and approximately 1 molar equivalent of an alkali hydroxide or halide, such as lithium hydroxide or lithium chloride, thoroughly mixed to a consistency suitable for extrusion. The extruded particles of LAI-S can be cylindrical or spherical and the particles dimensions are typically less than about 1 mm, preferably less than about 600 μm. In certain embodiments, the mixture can also include an inorganic substrate, although in certain other embodiments, the mixture does not include a substrate. Mixing of the PAC or PAC precursor and the alkali hydroxide or alkali halide can be conducted in an extruder, wherein the product mixture can then be extruded to a desired size and shape of particle or pellet. Alternatively, the mixing can be conducted in any vessel suitable to provide sufficient mixing of the materials, and the product mixture of said mixing vessel can then be supplied to an extruder for the preparation of particles or pellets of various sizes and/or shapes. Exemplary extruders are known in the art, and can include basket extruders or twin dome extruders.

The extruder can prepare particles or pellets ranging in size from 25-100 microns, alternatively between about 100-200 microns, alternatively between about 100-500 microns, alternatively between about 500-1000 microns. Additionally, the extruder can be used to prepare particles or pellets that are spherical, oblong, cylindrical, or rectangular in shape. Alternatively, the particles or pellets can be of any desired shape.

Extraction

In one embodiment, the present invention provides a method for the extraction of lithium from a geothermal brine or lithium containing solution using a solid supported LAI composition.

As used herein, brine solution can refer to a solution of alkali and/or alkaline earth metal salt(s) in water, wherein the concentration of salts can vary from trace amounts up to the point of saturation. Generally, brines suitable for the methods described herein are aqueous solutions that may include alkali metal or alkaline earth chlorides, bromides, sulfates, hydroxides, nitrates, and the like, as well as natural brines. Exemplary elements present in the geothermal brines can include sodium, potassium, calcium, magnesium, lithium, strontium, barium, iron, boron, silicon, manganese, zinc, aluminum, antimony, chromium, cobalt, copper, lead, arsenic, mercury, molybdenum, nickel, silver, gold, thallium, radon, cesium, rubidium, vanadium, sulfur, chlorine, and fluorine, although it is understood that other elements and compounds may also be present. Brines can be obtained from natural sources, such as, Chilean brines, Argentinean brines, Bolivian brines, or Salton Sea brines, geothermal brines, sea water, oilfield brines, mineral brines (e.g., lithium chloride or potassium chloride brines), alkali metal salt brines, and industrial brines, for example, industrial brines recovered from ore leaching, mineral dressing, and the like. The method is equally applicable to artificially prepared brine or salt solutions, as well as waste water streams, assuming that the salinity of the solution is high enough (for example, a minimum concentration of about 14% by weight common salt). It is understood that, in certain embodiments, the exact concentration of salt sufficient to drive to sorption of lithium into the lithium aluminate is dependent on the exact species and their concentrations present in the solution.

In certain embodiments, the present invention can be used in conjunction with means for first removing silica from the brine. For example, in certain embodiments, the present brines contemplated for use herein can be treated by known means, typically known as silica management, to first remove silica and/or iron, prior to the recovery of any lithium. In certain embodiments, the brine or lithium containing solution can be filtered or treated to remove solids or other elements present prior to the selective recovery of lithium.

In certain embodiments, during extraction using the solid supported LAI composition, the temperature of the brine is maintained at between about 40° C. and 120° C., preferably between about 70° C. and 100° C. Alternately, the temperature is maintained at between about 85° C. and 100° C. In other embodiments, the temperature is maintained at between about 70° C. and 85° C. In other embodiments, the extraction can be carried out at a temperature that is less than about 110° C. The method also includes the steps of maintaining the pH in the range of between about 4 and 8. Alternatively, the pH is maintained at between about 4 and 6. In other embodiments, the pH is maintained at between about 6 and 8.

Suitable brine solutions for use with the present invention include solutions having greater than 10% by weight saline content, and in certain embodiments, upwards of 16% by weight saline content.

Generally, during use, the LAI-S granular composition prepared according to the above described process is loaded into a column (such as a chromatography column, which can include appropriate packing for retention of the granular material), and washed with a predetermined amount of water to remove a portion of the lithium chloride from the matrix, thereby creating vacant sites that are available to receive lithium halides or other lithium salts from a brine or solution.

For example, upon exposure to a solution or brine that includes lithium chloride, the LAI matrix can then accept lithium chloride ions. The initial wash water preferably includes at least a small concentration of lithium chloride, or other lithium salt. In certain embodiments, the wash water includes at least 100 ppm lithium chloride. In alternate embodiments, the wash water includes at least 150 ppm lithium chloride. In yet other embodiments, the wash water includes at least 200 ppm lithium chloride. In certain embodiments, the wash water may include a salt, such as sodium chloride, potassium chloride, or any other salt or non-ionic solute that may be advantageous for a particular lithium salt extraction process. Typically, chlorides are selected due to their relatively low cost, however it is understood that other halides can also be used. In certain embodiments, divalent and trivalent salts are avoided.

After the vacant sites in the LAI-S composition have been exposed by rinsing with the wash water, the vacant sites can then be loaded with new lithium chloride or other salts by exposing the LAI-S composition to the brine or solution that includes lithium chloride or other lithium salts. In certain embodiments, the brine or solution does not include salts that will compete with the extraction of lithium. As the lithium chloride in the brine or solution contact a vacant site, the lithium ions are captured by the LAI-S composition and the exposed vacancies are filled. After the LAI-S composition has become saturated with a lithium salt, for example lithium chloride, the flow of the brine can be stopped, thereby stopping the uptake of lithium. Lithium ions captured by the LAI-S composition can then be unloaded from the LAI-S composition by again washing the composition with wash water. In certain embodiments, as noted with respect to the initial wash water above, the wash water can include a small amount of lithium chloride, such as at least 100 ppm of lithium, sufficient to ensure that at least a portion of the capture sites on the LAI-S composition are filled with ions to prevent the LAI-S composition from collapsing. The process can be repeated many times, as desired The loading and unloading of the LAI-S composition can be monitored by measuring the lithium concentration of the outlet of the column. Means for monitoring the concentration of the lithium can include ion selective electrodes, ion chromatography, or spectrometric analysis, such as atomic absorption or inductively coupled plasma spectroscopy, and other means known in the art. The loading process is typically fairly efficient, such that at least 50% of the lithium ions in the brine or solution are captured by the LAI-S composition, preferably at least 75% of the lithium ions in the brine or solution are captured by the LAI-S composition. As such, a rapid increase in the lithium ion concentration at the outlet of the LAI-S composition is indicative of saturation of the column. Similarly, when recovering the captured lithium ions from the LAI-S composition, as the process is proceeding and lithium ions are being removed, a decrease in the concentration of lithium ions from a first increased concentration correlating to the initial recovery of captured lithium to a steady state concentration that is approximately equal to the steady state concentration of the lithium in the wash water is generally indicative of the removal of a majority of the ions captured by the composition. At this point, the process for capturing lithium ions can begin again.

In certain embodiments, the LAI-S composition prepared according to the present methods has an extraction capacity suitable for use in brines having a lithium concentration similar to that of the Hudson Ranch geothermal brines, i.e., a lithium concentration of about 260 ppm. The extraction capacity of the LAI-S composition is greater than about 1 mg of lithium per gram of the LAI-S composition, preferably at least about 5 mg of lithium per gram of the LAI-S composition, even more preferably up to about 10 mg of lithium per gram of the LAI-S composition. The extraction capacities would be larger for brines containing higher concentrations of lithium.

EXAMPLES

Example 1

Approximately 0.9 g of FW80 diatomaceous silica (EP Minerals, USA) was combined with approximately 2 g of a 50% by weight Al2OH5Cl solution (about 9 mmol of aluminum) and stirred at room temperature for about 30 min. To the resulting mixture was added approximately 0.21 g LiCl (5 mmol) and stirred at room temperature for about 5 min. To the lithium chloride intercalated mixture was added about 2 mmol lithium hydroxide (5.7% by weight aqueous solution) and stirred. The resulting slurry was dried at 70° C. and washed with 15 mL of deionized water. The resulting product (1.4 g, 155% yield; which includes both the substrate and lithium aluminate intercalate) was collected having an Al:Li ratio of about 1:0.26.

Example 2

Approximately 1 g of MP78 diatomaceous silica (EP Minerals, USA) was combined with approximately 2 g of a 50% by weight Al2OH5Cl solution (about 9 mmol of aluminum) and stirred at room temperature for about 30 min. To the resulting mixture was added approximately 0.22 g LiCl (5 mmol) and stirred at room temperature for about 5 min. To the lithium chloride intercalated mixture was added about 2 mmol lithium hydroxide (5.7% by weight aqueous solution) and stirred. The resulting solid was dried at 70° C. and washed with 10 mL of deionized water. The resulting product (1.9 g, 190% yield; which includes both the substrate and lithium aluminate intercalate) was collected having an Al:Li ratio of about 1:0.26. The resulting product (1.9 g, 190% yield; which includes both the substrate and lithium aluminum intercalate) was collected having an Al:Li ratio of about 1:0.25.

Example 3

Approximately 1 g of FW80 diatomaceous silica (EP Minerals, USA) was combined with approximately 2 g of a 50% by weight Al2OH5Cl solution (about 9 mmol of aluminum) and stirred at room temperature for about 30 min. To the resulting mixture was added approximately 2.8 g of a lithium hydroxide (5.7% by weight) aqueous solution and stirred at room temperature for about 10 min. To the lithium hydroxide intercalated mixture was added with stirring a solution of about 2 N HCl until a pH of about 6.5 was achieved. The resulting solid was separated and dried at a temperature of about 60° C. for approximately 12-18 hours, followed by drying at a temperature of about 120° C. for about 3-4 hours. The resulting solid was washed with deionized water and dried at about 60° C. The resulting product (1.23 g, 123% yield; which includes both the substrate and lithium aluminate intercalate) was collected having an Al:Li ratio of about 1:0.17.

Example 4

Approximately 1 g of MP78 diatomaceous silica (EP Minerals, USA) was combined with approximately 2.1 g of a 50% by weight Al2OH5Cl solution (about 9 mmol of aluminum) and stirred at room temperature for about 30 min. To the resulting mixture was added approximately 2.0 g of a lithium hydroxide (5.7% by weight) aqueous solution and stirred at room temperature for about 10 min. To the lithium hydroxide intercalated mixture was added with stirring a solution of about 2 N HCl until a pH of about 6.5 was achieved. The resulting solid was separated and dried at a temperature of about 60° C. for approximately 12-18 hours, followed by drying at a temperature of about 120° C. for about 3-4 hours. The resulting solid was washed with deionized water and dried at about 60° C. The resulting product (1.75 g, 175% yield; which includes both the substrate and lithium aluminate intercalate) was collected having an Al:Li ratio of about 1:0.19.

Example 5

Approximately 1 g of FW80 diatomaceous silica (EP Minerals, USA) was combined with approximately 2.1 g of a 50% by weight Al2OH5Cl solution (about 9 mmol of aluminum) and stirred at room temperature for about 30 min. To the resulting mixture was added approximately 2.1 g lithium hydroxide (5 mmol) and stirred at room temperature for about 10 min. To the lithium hydroxide intercalated mixture was added about 6 mmol LiCl and stirred. The resulting solid was dried at 120° C. for 2 hours and washed with 12 mL of water and further dried. The resulting product (1.75 g, 175% yield; which includes both the substrate and lithium aluminate intercalate) was collected having an Al:Li ratio of about 1:0.53.

Example 6

Scale up of example 5. Approximately 760 g of FW80 diatomaceous silica (EP Minerals, USA) was combined with approximately 3.43 kg of a 50% by weight $Al_2OH_5O$ solution (about 15.9 mmol of aluminum) and stirred at room temperature for about 1 hour. To the resulting mixture was added approximately 3.34 kg of a 5.7% LiOH solution (8 mol) and stirred at room temperature for about 2 hours. To the lithium hydroxide intercalated mixture was added about 425 g (10 mol) LiCl followed by 500 g of deionized water and stirred. The resulting slurry was dried at 70° C. until all the solids were dry. Finally, the solids were washed with generous amounts of deionized water (approximately 10 L) at room temperature and dried at 70° C. The resulting product, ca. 2.0 Kg was collected having an Al:Li ratio of about 1:0.5.

Example 7

Figure 11:
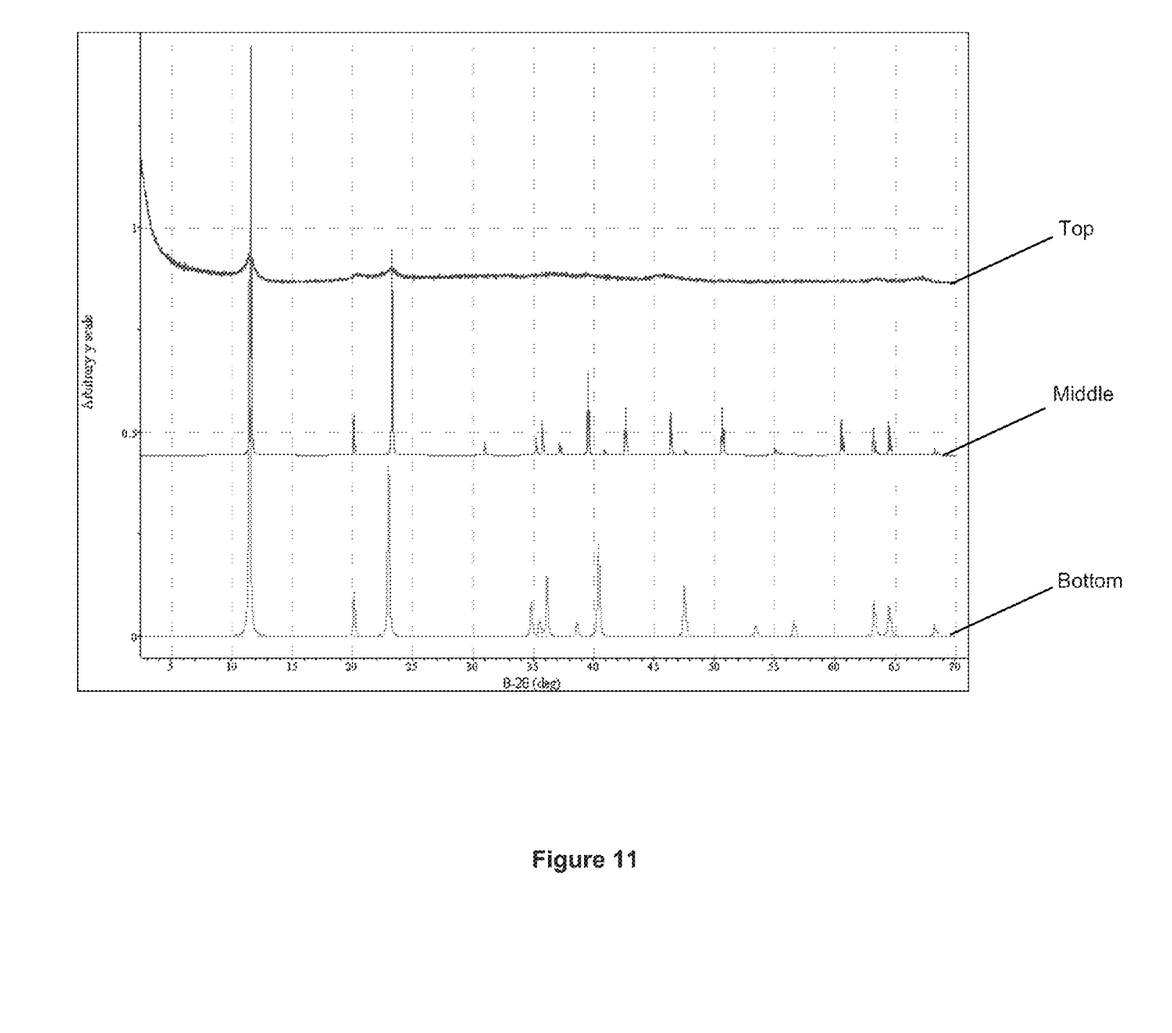
FIG. 11 is graph showing the x-ray powder diffraction pattern for a lithium aluminate deposited on neutral activated alumina according to one embodiment of the present invention (top), monohydrate of lithium aluminate ($LiAl_2(OH)_6Cl.H_2O$) (middle) and dihydrate of lithium aluminate $LiAl_2(OH)_6Cl.2H_2O$ (bottom).

Approximately 20 g of neutral activated alumina having an average diameter of between about 50-200 microns (Aldrich, Milwaukee, USA) was combined with approximately 70 g of a 50% by weight $Al_2OH_5Cl$ solution (about 0.32 mmol of aluminum) and stirred at room temperature for about 1 hour. To the resulting mixture was added approximately 60 g of a 5.7% LiOH solution (0.14 mol) and stirred at room temperature for about 2 hours. To the lithium hydroxide intercalated mixture was added about 10.4 g LiCl (0.25 moles) followed by 50 g of deionized water and stirred. The resulting slurry was dried at 70° C. until all the solids were dry. Finally, the solids were washed with generous amounts of deionized water (about 200 g) at room temperature and dried at 70° C. The resulting product, approximately 63 g, was collected having an Al:Li ratio of about 1:0.3. The x-ray diffraction pattern of the LAI-S composition is shown in FIG. 11 (top), and is compared against mono- and di-hydrates of pure LAI-Cl (middle and bottom, respectively).

Example 8

An activated alumina composition prepared as detailed in example 7 was tested for loading lithium ion from a synthetic geothermal brine (that mimics the geothermal fluids of Salton Sea, Calif.). Our repeated loading/unloading studies at high temperatures 95° C. indicate that the surface modified porous alumina repeatedly exhibits at least about 2 mg/L, alternatively at least about 2.6 mg/h, capacity under the conditions studied.

Example 9

Approximately 20 g of iron oxide particles (10 microns, Sigma Aldrich, USA) was combined with approximately 70 g of a 50% by weight solution of Al2OH5Cl and stirred at room temperature for about 30 min. To the resulting mixture was added approximately 60 g of an aqueous solution that included about 5.7% by weight lithium hydroxide and stirred at room temperature and dried at 70° C. for about 4 hours and further dried at a temperature of about 100° C. overnight. The resulting solid was washed with deionized water and dried at about 60° C. The resulting product (40.2 g, approximately a 200% yield; which included both the substrate and lithium aluminate intercalate) was collected having an Al:Li ratio of about 1:0.38. The equilibrium lithium loading capacities measured for this material using synthetic brine solution containing 670 mg/L lithium are found to be around 4.5 g/l.

As is understood in the art, not all equipment or apparatuses are shown in the figures. For example, one of skill in the art would recognize that various holding tanks and/or pumps may be employed in the present method.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

As used herein, recitation of the term about and approximately with respect to a range of values should be interpreted to include both the upper and lower end of the recited range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The invention claimed is:

1. A composition for the recovery of lithium from a lithium containing solution comprising:
   a porous membrane containing lithium aluminate intercalate, wherein the lithium aluminate intercalate is deposited into the membrane by contacting a polyaluminum hydroxyl halide solution and the membrane in the presence of lithium salt, thereby integrating the lithium aluminate intercalate into the membrane.

2. The composition of claim 1, wherein the membrane is a polymeric membrane.

3. The composition of claim 1, wherein the membrane is an inorganic membrane.

4. The composition of claim 1, wherein the polymeric membrane has an average pore size of less than about 5 μm.

5. The composition of claim 1, wherein the ratio of aluminum to lithium is between about 1:0 and 1:0.6.

6. The composition of claim 1, wherein the lithium salt is lithium hydroxide.

7. The composition of claim 1, wherein the lithium salt is lithium chloride.

8. A method for preparing a composition for the recovery of lithium from a lithium containing solution, wherein the method comprises the steps of:
   providing a porous membrane;
   contacting the porous membrane with polyaluminum hydroxyl halide to form an alumina integrated porous membrane; and
   intercalating a lithium salt into the alumina layer on the porous membrane to form a lithium aluminate intercalate.

9. The composition of claim 8, wherein the porous membrane is a polymeric membrane.

10. The composition of claim 8, wherein the porous membrane is an inorganic membrane.

11. The method of claim 8, wherein the porous membrane is a resin-based membrane.

12. The method of claim 8, wherein the polyaluminum hydroxyl halide has a general formula, $Al/(OH)_a(X)_b$, wherein the halide X is selected from the group consisting of fluoride, bromide, chloride and iodide, and wherein a and b are each between about 0.5-5.5, and wherein the sum of a and b is 6.

13. The method of claim 8, wherein a is between about 3 and 6 and b is between about 0.5 and 3, and wherein the sum of a and b is 6.

14. The method of claim 8, wherein the halide is chlorine.

15. The method of claim 8, wherein the lithium salt intercalated into the polyaluminum hydroxyl chloride coating is lithium chloride.

16. The method of claim 8, wherein the step of intercalating the lithium salt into the polyaluminum hydroxyl halide coating comprises the steps of:
   contacting the polyaluminum hydroxyl halide coating with an alkali hydroxide, and
   then optionally contacting the coating with the lithium salt.

17. A method for removal and recovery of lithium from a lithium containing solution, comprising the steps of:
   contacting the lithium containing solution with a porous membrane, said porous membrane having a lithium aluminate intercalate layer, wherein the step of contacting the lithium containing solution and the porous membrane with the lithium aluminate intercalate layer results in the removal of at least a portion of the lithium present in the lithium containing solution and the capture of said lithium by the porous membrane with the lithium aluminate intercalate layer; and
   recovering the captured lithium by washing the porous membrane with the lithium aluminate intercalate layer with a wash water.

18. The method of claim 17, wherein said wash water has a lithium concentration of less than about 200 ppm.

* * * * *